United States Patent [19]
Curby et al.

[11] 3,851,246
[45] Nov. 26, 1974

[54] METHOD OF PREDICTING THE POST TRANSFUSION VIABILITY OF PRESERVED ERYTHROCYTES AND OTHER SIMILAR CELLS

[75] Inventors: William A. Curby, West Newton; Fabian J. Lionetti, Milton, both of Mass.

[73] Assignee: The United States of America as represented by the Secretary of the Navy, Washington, D.C.

[22] Filed: Nov. 26, 1973

[21] Appl. No.: 419,179

[52] U.S. Cl. .......................... 324/71 CP, 23/230 B
[51] Int. Cl. ...................... G01n 27/00, G01n 21/22
[58] Field of Search ................ 324/71 CP; 23/230 B

[56] References Cited
UNITED STATES PATENTS
3,586,859   6/1971   Katz et al. ..................... 23/230 B X OTHER PUBLICATIONS
Gibson et al., "The Measurement of Post-Transfusion Survival..." J. Clinical Investigation, Vol. 26, pp. 704–714, 1947.
Mattern et al., "Determination of Number and Size of Particles by Electrical Gating: Blood Cells" J. Appl. Physiol., Vol. 10, pp. 56–70, 1957.
Magath et al., "Electronic Blood-Cell Counting" American J. of Clinical Pathology, Vol. 34, No. 3, Sept., 1960, pp. 203–213.

Primary Examiner—Michael J. Lynch
Assistant Examiner—Rolf Hille
Attorney, Agent, or Firm—R. S. Sciascia; C. E. Vautrain, Jr.

[57] ABSTRACT

A method is provided for determining the quality or post transfusion viability of preserved human red cells, marrow cells, and other body cells having similar characteristics which comprises suspending a small quantity of the preserved cells in a non-damaging fluid and then processing the cells in an electronic particle size analyzer to determine distribution and quality. Damaged, i.e., fragmented, cells and swollen cells are differentiated from viable cells by their size, permitting counts to be made of the remaining cells and identification thereof by size.

5 Claims, 5 Drawing Figures

METHOD OF PREDICTING THE POST TRANSFUSION VIABILITY OF PRESERVED ERYTHROCYTES AND OTHER SIMILAR CELLS

This invention concerns a method of determining the viability of blood cells and, more particularly preserved red cells and marrow cells.

The viability of cells after cryo-preservation has been estimated from survival studies in vivo and from microscopic appearance. Electronic multichannel analysis of cell volume has been used to evaluate preserved marrow cells and to study factors affecting the volume of red cell ghosts. There has been, however, no satisfactory method for determining the viability of preserved red cells, marrow cells and blood cells having similar characteristics in short enough periods of time to have clinical utility. Ordinarily, blood may be preserved for a maximum of 21 days after which it is discarded since there is no rapid in vitro procedure for determining its present viability. Such existing procedures as determining viability by tagging the cells radioactively, transfusing the cells into a living body, and recovering the cells thereafter and by microscopically determining the survival rate of the processed cells are extremely wasteful of a large volume of cells and too lengthy to be useful other than as for laboratory data. Further, as to marrow cells the quality can presently be determined only roughly by estimation after observing a beneficial change in the condition of the patients receiving the transfused cells. Although both preserved whole red and marrow cells may be studied microscopically, this method is not applicable to determine viability since viability may be lost during the period of the examination. The foregoing deficiencies in determining the quality of whole red cells, marrow cells, and other cells having similar characteristics are overcome by the present invention which permits determination of viability to be made in a very short time using a minute sample of cells.

According to the present invention, red cells, marrow cells and like cells taken from liquid or frozen preserved whole cell suspensions are withdrawn in a small volume from their storage containers and a fraction of this volume is suspended preferably in isotonic NaCl. Cell counts and volume distribution curves are then determined in an electronic particle size analyzer wherein particles are carried in a conductive fluid through an aperture through which an electric current is flowing. Since different particle sizes cause different changes in potential across the aperture, the resulting output of the analyzer is summarized in a cumulative frequency curve which is a plot of the number of cells in a given channel, i.e., of a given size, against increasing volumes of cells. The height of the cell distribution, and the range and frequency of volumes of the change from the distribution obtained from unpreserved freshly obtained normal cells indicate the quality of cells from which a prediction of post transfusion viability, i.e., efficacy to take part in normal blood cell functions, is made.

Accordingly, it is an object of the present invention to provide a method whereby the viability of red blood cells and marrow cells may be determined in a very short period of time using a very small sample.

Another object of the invention is to provide a method of rapidly determining the viability of red cells or marrow cells taken from liquid or frozen preserved blood cells so that the viability of erythrocytes of the cells to take part in normal blood cell function may be determined and the major portion of the preserved cells used.

A further object of the invention is to provide a method of determining the viability of cells in a very short period of time wherein large portions of a unit are not consumed or lost or rendered useless by radioactive tagging of the cells.

A still further object of the invention is to provide a method of determining the viability of cells other than red blood cells such as marrow cells in a very short period of time so that the cells may be transfused while still having viability.

Other objects, advantages and novel features of the invention will become apparent from the following detailed description thereof when considered in conjunction with the accompanying drawings in which like numerals represent like parts throughout and wherein.

Figure 1:
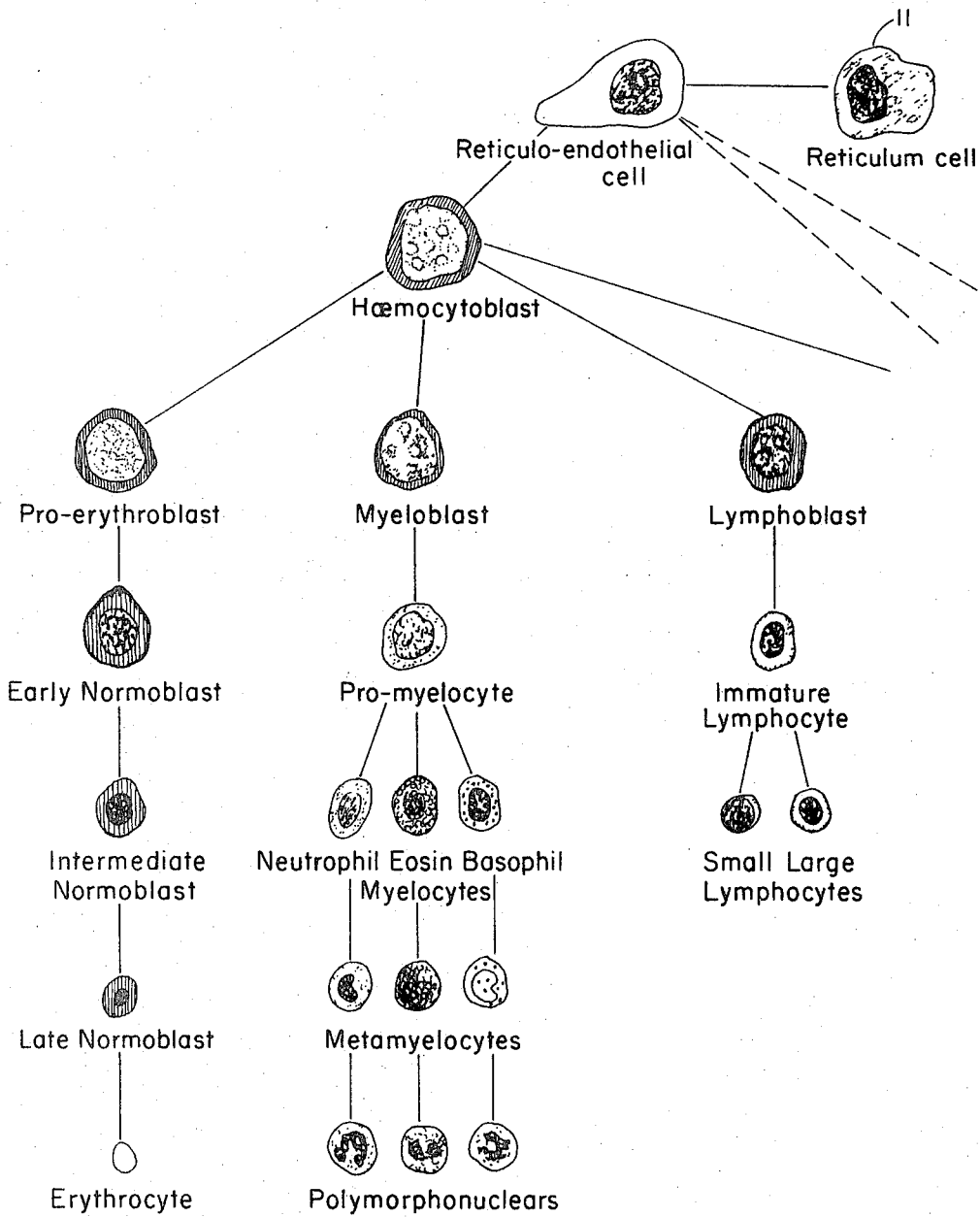
FIG. 1 is a schematic presentation of the development of normal blood and bone-marrow cells.

The cells shown in FIG. 1 illustrate steps in the development of normal blood and bone-marrow cells from the fundemental cell indicated at 11. As may be noted, the shapes of the cells in virtually all cases are substantially spherical which renders them appropriate for counting in an electronic multichannel particle size analyzer adapted for submicron and micron particle analysis such as the Coulter Particle Counter manufactured by Coulter Electronics, Inc., Hialeah, Fla. 33014. Although the counting of marrow cells is stressed in this application, it should be appreciated that marrow cells and other blood cells, especially the erythrocytes, have similar characteristics and that a method of counting which is applicable to marrow cells would also be applicable to erythrocytes, lymphocytes and other similar cells.

Figure 3:
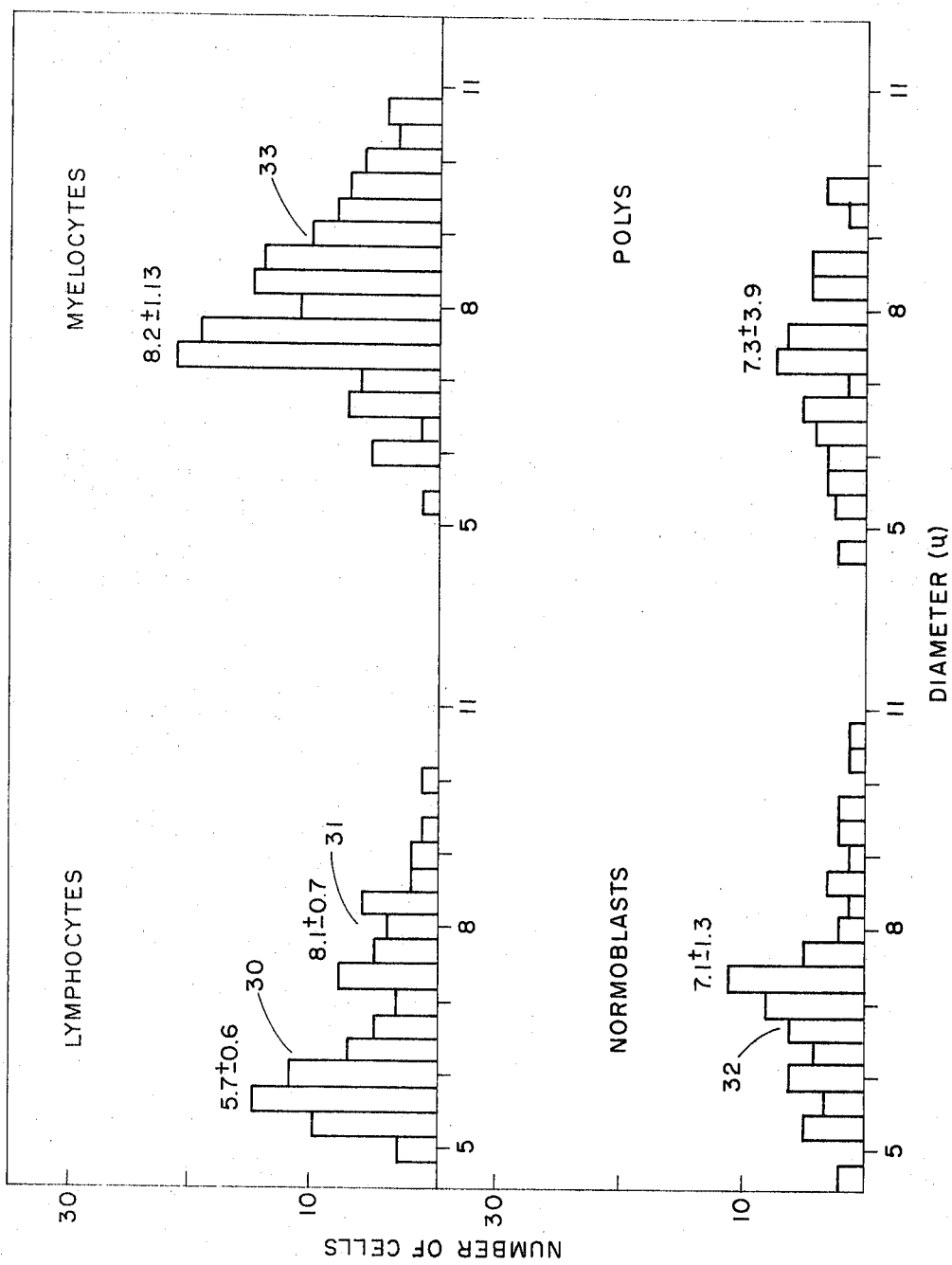
FIG. 3 is a series of graphs showing the distribution of four major cell types according to diameter.
Figure 4:
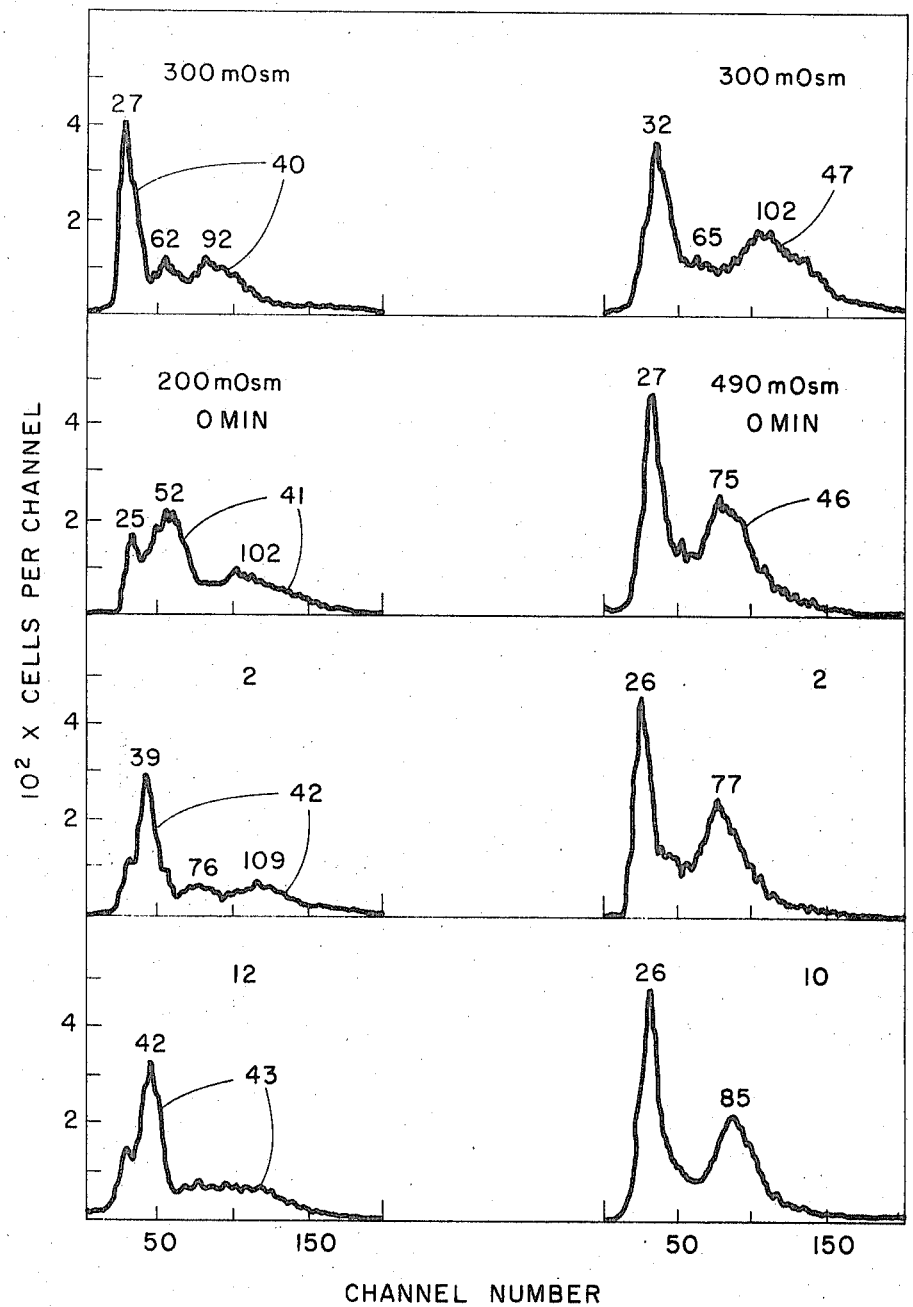
FIG. 4 is a series of graphs showing the typical swelling and shrinkage of cells before and after suspension in a NaCl solution.
Figure 5:
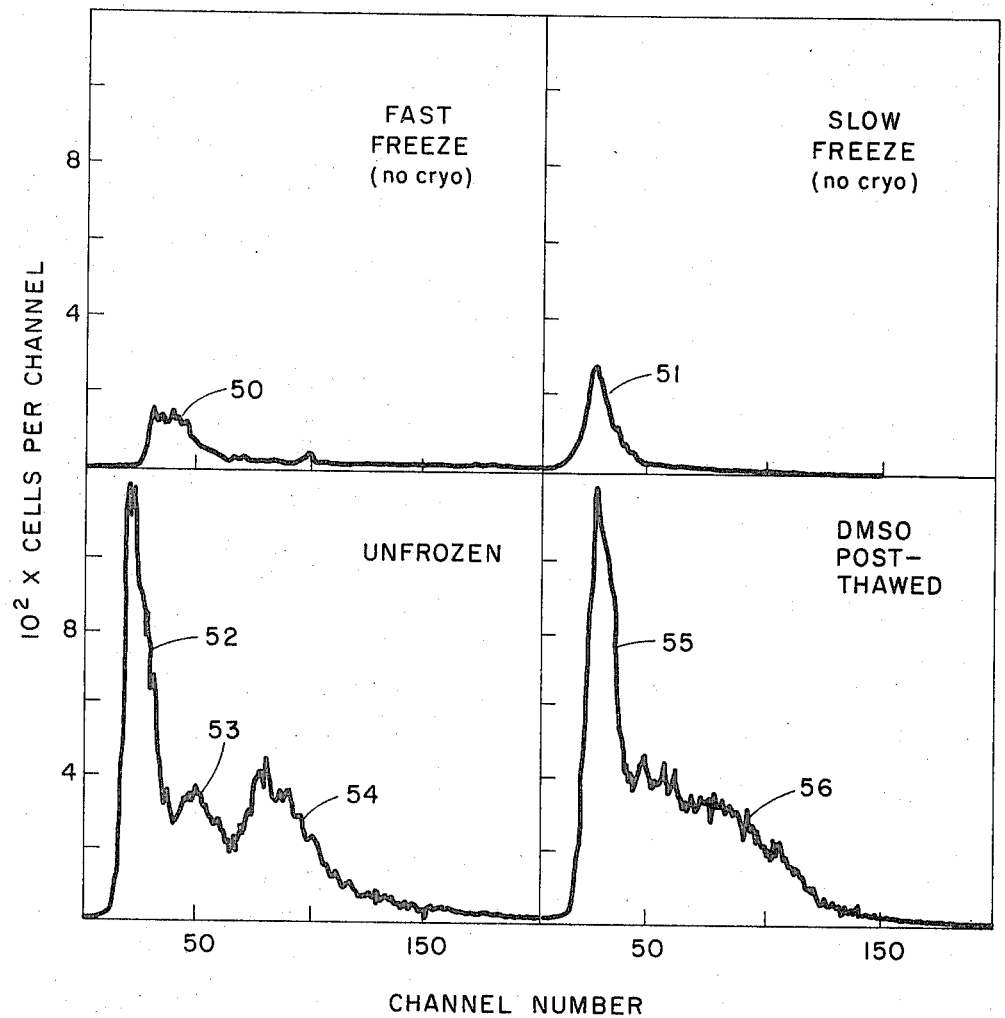
FIG. 5 is a series of graphs showing the effects of freezing on marrow cells.

The data presented in FIGS. 3–5 were derived from tests of the marrow from the femurs and tibias of mice. The cells were counted in a hemocytometer and diluted with medium to $2 \times 10^8$ erythroid cells and $0.4 \times 10^8$ myeloid cells/ml. Aliquots of 0.2 ml were placed in 9.8 ml of medium for cell distribution studies of which 0.05 ml was drawn by vacuum into the counting aperture of the instrument and counted. About 20,000 cells were counted routinely.

Figure 2:
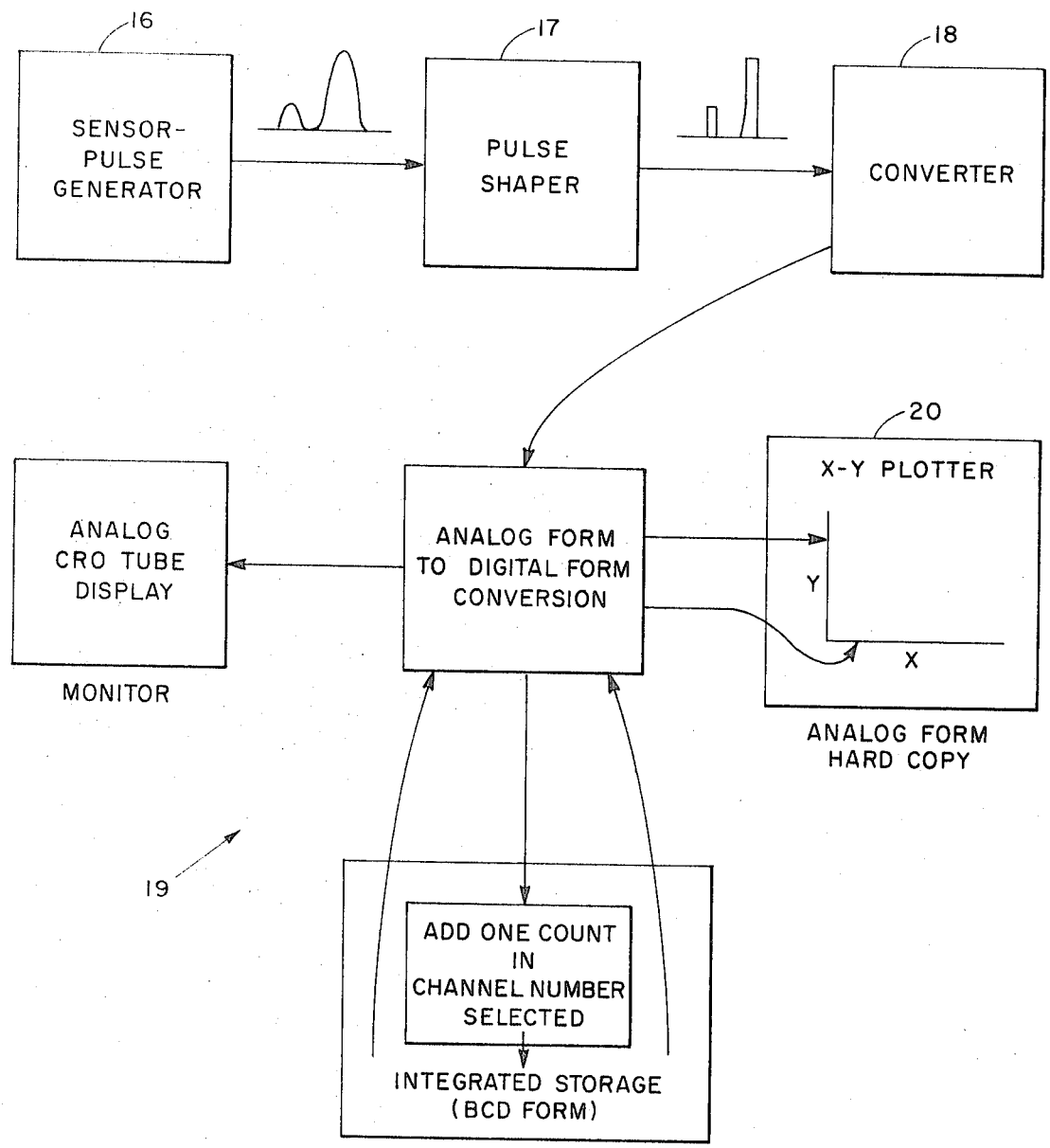
FIG. 2 is a block diagram of a multichannel analyzer displaying size distribution and count for a particle population.

The system shown in FIG. 2 includes a Coulter sensor-generator 16 which produces pulses with heights proportional to particle sizes connected to a pulse shaper 17 which produces fixed width pulses with height proportional to particle size and a converter 18 which produces pulse heights proportional to channel number. This output is coupled through the proper interfacing into a Nuclear-Chicago 200 channel Multi-Channel Pulse Height Analyzer 19. The pulses produced by the sensor are amplified and fed into a secondary pulse generator which produces fixed duration uniformly shaped pulses proportional in height to the input pulses. These pulses are measured and assigned a position on the X-axis of the analyzer. This axis is divided into 200 parts or channels. Each time a pulse of the same height is measured, one more number is added to that particular channel. Thus the storage shows the number of pulses, i.e., particles, which have been assigned to a given channel at any instant in the sampling period. At the end of the sampling period the storage contains the total count, $P_x$, for pulses having any given pulse height within a pulse height range selected by the operator to be contained within the 200 channels of the storage. The data to be shown is recorded in analog form using a Mosley X-Y Plotter 20 whose ordinate is dc voltage proportional to the total count in a channel and whose abscissa is dc voltage proportional to channel number.

Polystyrene and polyvinyltoluene latex spheres of known diameters manufactured by the Dow Chemical Co. were used to standardize instrument variation. Because of variability in response of cells with differing conductivities, the instrument was calibrated by digitizing pulse heights and frequencies of marrow cell suspensions whose diameters were measured microscopically in hanging drops with a double refracting ocular.

The frequency distribution of marrow cells was recorded in analog form with the Mosley 703-B X-Y Plotter. Since most marrow cell types assume spherical configurations in fluid suspension, it was assumed that cell diameter was proportional to channel number.

FIG. 3 presents the size distribution of major marrow populations using mouse marrow diluted with medium TC-199 to a red count of $2 \times 10^8$ and a white cell count of $0.4 \times 10^8$. Four marrow specimens were used and the sizes of 100 cells were determined with an image-splitting ocular. The numbers above the graph peaks represent the means and standard deviations observed with two distinct lymphocyte populations noted as indicated at 30 and 31. The smaller of the two populations, 31, is ordinarily included in the erythrocyte population. Erythrocytes, not shown, comprised a large group with a ratio of erythroid to myeloid cells averaging 4 to 1. Normoblasts, indicated at 32 in FIG. 1, form a wide distribution of greater average diameter while myelocytes, indicated at 33 in that figure, form a large population of big cells. These distributions as diameters of spherical cells, in hanging drops, correspond substantially to three distributions which were measured electronically by the system of FIG. 2. Polymorphonuclear cells were distributed through most size ranges as were other rarer cells such as metamyelocytes, eosinophiles and proerythrocytes.

The response of marrow cell volume to changes in osmotic pressure is demonstrated in FIG. 4. Dilution of marrow with water to approximately 200 mOsm evoked a rapid shift in cellular distributions to the right, indicative of cell swelling, as indicated from 40 to 43 in the left panels. In the cell distribution indicated at 41, a large shift of the red cell peak is evident from channel 25 to 52 while myeloid cells swelled and lysed as shown by a spreading of the distribution and loss of area. The peak at the extreme left is a small osmotically resistant population, probably of small lymphocytes, normally a component of the erythroid distribution. The cell distributions indicated at 42 and 43 are measurements of the same sample 2 and 12 minutes later. Red cells were equilibrated in the swollen state, channels 39 and 43 while the lymphoid and granulocytic populations remained swollen and many cells lysed as indicated by the reduced area under the curves.

Shrinking as the result of an increase in osmotic pressure to 490 mOsm is shown at 46 when compared with 47. Within seconds all cells shrink appreciably as shown by decreases in channel numbers corresponding to peak volumes for each population, red cells in channels 32-27 and granulocytes in channels 102-74, while the lymphocyte peak became obscured. At 2 and 10 minutes the red cell population remained shrunken as the granulocytes swelled. At 10 minutes the entire distribution was compressed in an area related to the control condition of 300 mOsm and the lymphocyte distribution remained shrunken and within the area of the red cell curve.

In FIG. 5, the effects of freezing on mouse marrow cells are shown in two panels the upper of which represents at 50 the cell size and distribution of a marrow suspension that was frozen rapidly in a dry ice-EtOH bath with no cryoprotective agent and then thawed rapidly. The cell size and distribution of a similar sample that was frozen slowly, i.e., at $-1.86°C$ per minute, to $-80°C$ and then thawed at 42°C is indicated at 51. The bottom panel of FIG. 5 represents at the left the cell size and distribution in unfrozen mouse marrow cells and at the right a similar sample that had been frozen in 10% dimethylsulfoxide (DMSO) at 1.8°C per minute to $-80°C$ and then thawed at 43°C. These studies with mouse marrow reveal that cell damage can be quickly estimated by machine cell size analysis. Distributions obtained when marrow was rapidly frozen in a bath of dry ice and alcohol without cryoprotection or slowly frozen at 1.9°C/min. to $-80°C$ by mechanical means without cryoprotection indicated at 50 and 51 a nearly total loss of cells. As indicated at 52–56, no damage occurred when mouse marrow was mixed with DMSO, at 10% final concentration, at rates sufficiently slow to prevent volume change, i.e., in four small volume increments over 2 minutes. The samples were frozen at 1.9/min. to $-80°C$ and thawed in warm water at 43°C. Good recovery of cells was obtained as seen at 55 and 56, although the red and granulomatous cells after thawing were increased in volume. The cells after thawing were evaluated in vivo using the Till and McCulloch Procedure described in Radiation Research, Vol. 14, pp 213–222, 1961. Half of the cells were diluted with medium in increments to a final concentration of 2.5% DMSO. The remaining half was unwashed and contained 10% DMSO. Of the cells washed by dilution 50% survived as determined by spleen colony formation in groups of five mice, and there was no survival in five animals injected with previously frozen but unwashed cells, 10% DMSO.

The value of machine determination of size distribution of mixed populations of red cells, bone marrow cells and other related cells lies in the speed and simplicity with which the quantity and quality of the tissue can be assessed. The shape of the curves derived from as little as $10^3$ cells in 0.05 ml of sample characterizes the marrow. During cryopreservation marrow cells can be monitored during the manipulations of harvesting cells, dilution, and mixing with cryoprotective solutions. The yield of major cell populations after thawing and even viability may be estimated from the shape and area of the curves.

For the cryopreservation of blood or marrow cells it is necessary that the osmolality of all cell suspensions be maintained close to normal, i.e., in osotonicity. It has previously been emphasized, particularly with respect to glycerol, that slow addition, lengthy equilibration prior to cooling, and slow cooling are important conditions for successful preservation. Since freezing manifestly dehydrates cells, unavoidably lethal effects are introduced by intracellular ice, denaturation due to salt concentration, or by osmotic stress. It has previously been postulated that membrane injury results from the freezing of cell water when extracellular osmolality shrinks the cells below a minimum tolerable volume. The onset of this trauma as judged from percent hemolysis of human erythrocytes ranges from about 700 mOsm in $K^+$ depleted cells to 1300 mOsm in normal cells. In mouse marrow, we found hypertonic stress of a lesser magnitude to be reasonably tolerated. Marrow cells were, however, much more sensitive to hypotonic stress, particularly the large population of big cells, i.e., myelocytes, polymorphonuclear leukocytes. Presumably stem cells are included. Although the greatest osmotic stresses are produced during freezing and thawing, the optimum preservation conditions for blood or marrow are those in which osmotic stresses, and hence volume changes, are minimal. Viable blood platelets after thawing have been produced by control of osmotic pressure of cell suspensions before freezing and after thawing. Platelets in DMSO were frozen and thawed at rates sufficient to minimize volume changes. Furthermore, platelet injury due to osmotic stress was estimated separately from that due to freezing. The value of DMSO in this respect is the rapidity with which it permeates cells. The present data show also that marrow cells equilibrated with DMSO rapidly, i.e., within minutes, whereas 1.55 M glycerol required several hours at 2°C.

In view of the foregoing, it will be appreciated that electronic size analysis of mouse marrow cells enables the rapid assessment of quantity and quality of the cells. Three major distributions for mouse marrow were observed corresponding to erythrocytes, lymphocytes plus normoblasts and myelocytes. Marrow was most stable in balanced salt or tissue culture media at 2°C. When stored in isotonic NaCl at 4°C for 24 hours, the myelocyte population swelled and lysed. Glycerol, 1.55 M. greatly shrunk the lymphocytic and lyelocytic populations and required an hour to restore initial volume, while DMSO up to 15% was rapidly equilibrated without volume change. Machine analysis was applied to optimize conditions for freezing mouse marrow. A substantial number of tests has revealed good recovery of cells after thawing and good survival of transfused cells.

There is thus provided a procedure for testing the quality of human red cells and marrow cells that is extremely fast, does not entail destructive radioactive tagging, and may be accomplished using a very small volume, 0.001 ml or less, of blood from a liquid or frozen supply of whole blood or cell suspensions. Of the 0.001 ml, 0.0002 ml are in one practice of the procedure suspended in 10.0 ml of 0.15 M isotonic NaCl, i.e., an osmolality of 0.294, and the volumes of various sizes of cells in the sample volume determined in an electronic particle size analyzer. A cumulative frequency curve is obtained which is a plot of the number of particles, i.e., cells, per channel against increasing volumes of cells, i.e., channel number. The height of the cell distribution, the range and frequency of cell volumes, and the changes from the distribution obtained from unpreserved freshly acquired normal cells indicates the quality of the cells from which a prediction of post transfusion viability, i.e., their efficacy to take part in normal blood cell functions, is made.

The sampling, dilution and electronic determination of volume distribution can be made in about one minute. The number of cells required for a reliable determination of quality is substantially 20,000. For red cells, this is 0.0004 of the average number in 1 mm of whole blood. Substantially the full preserved unit of blood may be transfused. In contrast, present techniques require that a large portion of the unit of red cells be consumed in the testing for quality. For marrow cells, subjective, equivocal and time consuming microscopy can be avoided. This allows for the timely transfusion of marrow cells from the donor to the recipient of cells which have not lost their viability upon standing while the microscopic test is being conducted.

Obviously many modifications and variations of the present invention are possible in the light of the above teachings.

What is claimed is:

1. A method of determining the viability of preserved and then restored whole blood and marrow cells from a minute sample of a volume of said cells comprising:

stressing said cells to determine whether they can maintain size and shape integrity in the stressed state by suspending the cells in a salt solution that is other than isotonic;
obtaining the distribution of said cells in an electronic particle size analyzer;
comparing sample cell volume distribution and cell volume distribution of unpreserved freshly obtained normal cells; and
determining viability by ascertaining whether the sample cells have substantially maintained size and shape.

2. The method of claim 1 wherein viability of erythrocytes, lymphocytes, normoblasts and myelocytes is determined by differentiating between swollen, shrunken, fragmented or lysed cells and cells having substantially no volume change.

3. The method of claim 2 wherein the quality of the test cells is derived from a comparison of a two-dimensional plot of the range and frequency of cell volumes wherein the ordinate represents the frequencies of cells of given sizes and the abscissa represents the range of cell sizes with a plot of cell distributions similarly obtained from unpreserved freshly acquired cells.

4. A method of determining the viability of red blood cells comprising:
suspending a sample of said cells in a non-isotonic salt solution;
determining cell size distribution in a computer-compatible high sensitivity analysis system adapted to measure particles $0.2\mu$ in diameter and larger in fluid;
deriving a cumulative frequency curve from a plot of number of cells per channel versus channel number wherein increasing channel numbers represent increasing cell volumes; and determining cell efficacy to take part in normal blood cell function by determining whether the sample cells have substantially maintained size and shape after being stressed by suspension in said salt solution through comparison with unpreserved freshly obtained normal cells.

5. A method of determining the viability of marrow cells comprising:
withdrawing a sample of the marrow whose viability is to be determined;
mixing the marrow with dimethysulfoxide such that a 10% final concentration is obtained in fractional volume increments over a period of substantially two minutes;
suspending said mixture in a non-isotonic salt solution;
determining size distribution in a computer-compatible high sensitivity analysis system adapted to measure particles $0.2\mu$ in diameter and larger in fluid;
deriving a cumulative frequency curve from a plot of number of cells per channel versus channel number wherein increasing channel number represent increasing cell volumes; and
determining cell efficacy by determining whether the sample cells have substantially maintained size and shape after being stressed by suspension in said salt solution through comparison with unpreserved freshly obtained normal cells.

* * * * *